United States Patent [19]

Godoshian

[11] Patent Number: 4,490,579
[45] Date of Patent: Dec. 25, 1984

[54] AUTO-DIALING PAGER RECEIVER

[76] Inventor: Vanig Godoshian, 2500 Pontiac Dr., Pontiac, Mich. 48053

[21] Appl. No.: 485,272

[22] Filed: Apr. 15, 1983

[51] Int. Cl.³ .......................................... H04M 11/00
[52] U.S. Cl. ................. 179/2 EC; 179/90 B
[58] Field of Search ............... 179/2 E, 5.5, 5 P, 5 R, 179/18 BF, 90 B, 90 BD, 90 BB, 90 AN, 90 AD, 84 VF, 2 EC; 340/311.1, 825.48, 825.44; 455/38, 68-71

[56] References Cited

U.S. PATENT DOCUMENTS

| 4,103,107 | 7/1978 | D'Amico et al. | 179/2 EC |
| 4,172,969 | 10/1979 | Levine et al. | 179/2 EC |
| 4,178,475 | 12/1979 | Taylor et al. | 179/2 EC |
| 4,197,526 | 4/1980 | Levine et al. | 340/311 |
| 4,219,698 | 8/1980 | Birilli et al. | 179/5 P |
| 4,243,845 | 1/1981 | Feinberg et al. | 179/90 B |
| 4,263,480 | 4/1981 | Levine | 179/2 EC |
| 4,336,524 | 6/1982 | Levine | 340/311.1 |
| 4,408,099 | 10/1983 | Ishii | 179/2 EC |

FOREIGN PATENT DOCUMENTS 2078467 1/1982 United Kingdom ............ 179/2 EC

Primary Examiner—Gene Z. Rubinson
Assistant Examiner—W. J. Brady
Attorney, Agent, or Firm—Hauke and Patalidis

[57] ABSTRACT

A telephone dialing pager providing a visual display of a caller's telephone number and storage of a plurality of telephone numbers of consecutive callers. The stored information data corresponding to each caller's telephone number is recalled for display by the user of the pager and controllably transformed into appropriate dual tone multi frequencies for dialing the callers' telephone numbers.

4 Claims, 1 Drawing Figure

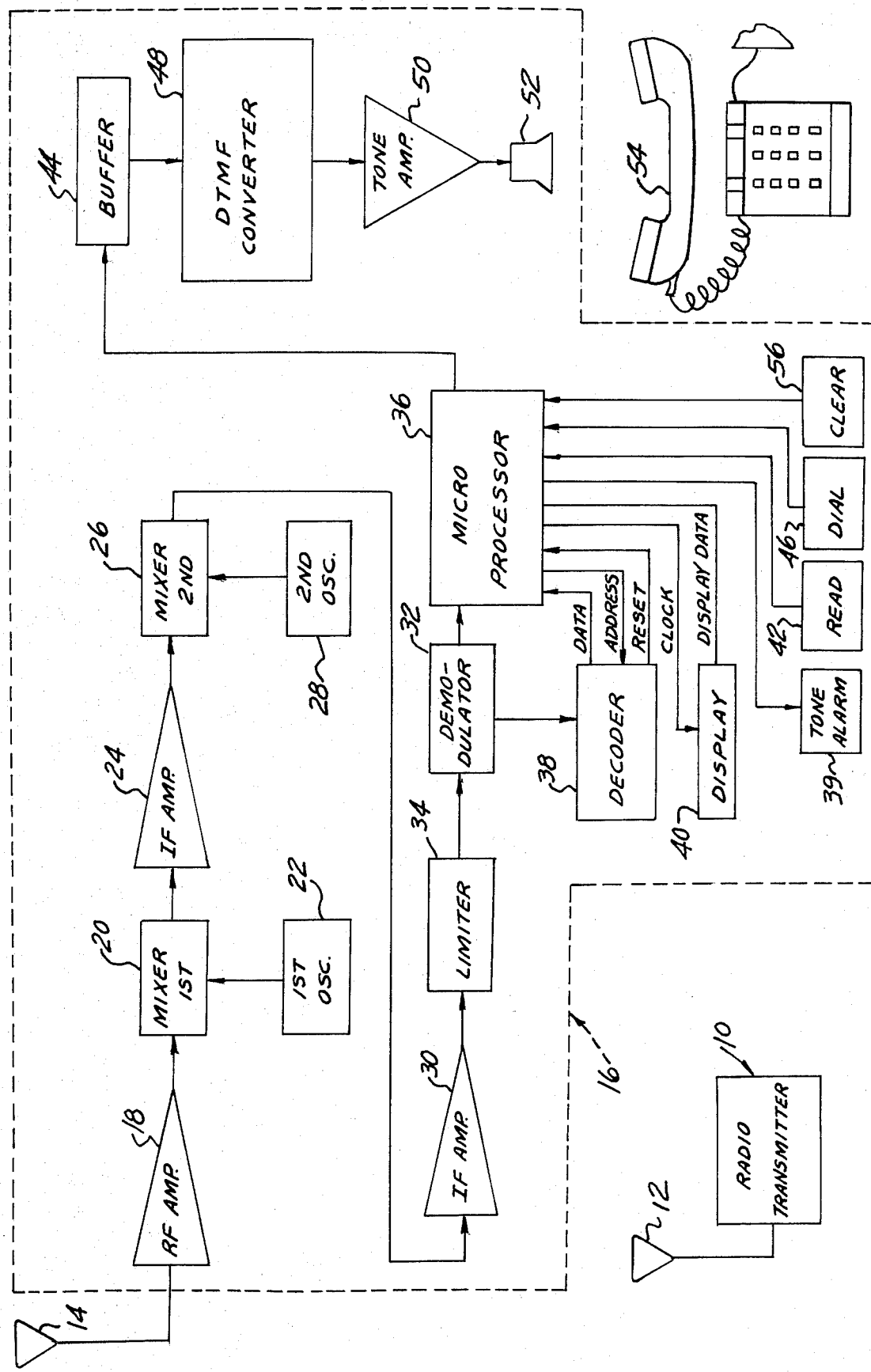

AUTO-DIALING PAGER RECEIVER

BACKGROUND OF THE INVENTION

The present invention relates to radio paging equipment in general, and more particularly to a radio paging receiver having a memory for storing callers' telephone numbers and provided with a telephone automatic dialer.

It is well known, at the present, to remotely page a person out of reach from a handset telephone to alert the person to return a telephone call, for example. Pagers take the form of portable miniature mobile radio receivers, being carried by a person and provided with an audible "beeper", vibrator or other alarm device. In their simplest form, tone-only pagers such as beepers require that the person being paged reach a telephone, dial a predetermined number such as that of a telephone answering service, in order to receive a message.

In addition to tone-only pagers and tone-and-voice pagers, pagers with digital displays are presently available on the market. In tone-and-voice pagers, after the unit beeps, vibrates or flashes a light to alarm the user, the mobile receiver remains activated for a few seconds to receive an audio message from the caller. In display pagers, after the user is alerted, a short message is momentarily displayed on a liquid crystal display (LCD) module, for example in the form of the telephone number of the caller. Some display pagers are in addition, capable of storing in an internal memory one or more of the displayed messages, such as telephone numbers.

SUMMARY OF THE INVENTION

The present invention is an improvement on pagers, more particularly display pagers, having internal memory compatibility, providing an automatic dialing function enabling the user to play back the telephone numbers stored in the memory of the pager, and in so doing to activate a dual tone multi-frequency transducer such as to produce appropriate audio tones which, through direct acoustical coupling with a telephone handset microphone mouthpiece, dial the caller.

Other objects and advantages of the present invention will become apparent to those skilled in the art when the following description of the best mode contemplated for practicing the invention is read in conjunction with the accompanying drawing wherein:

BRIEF DESCRIPTION OF THE DRAWING

The single FIGURE represents a block diagram of an example of dialing pager according to the present invention.

DETAILED DESCRIPTION OF THE PREFERRED EMBODIMENT

Referring to the drawing, a dialing pager according to the present invention comprises a radio transmitter 10 provided with a radiating antenna 12, capable of transmitting an encoded message consisting, in the example of application of the present invention, of a receiver address code and a telephone number for the user to call back. The message is in the form of a sequence of binary data information, frequency modulated, in the VHF, UHF and higher radio frequency spectrum. The FM (frequency modulated) radio signals are received at the antenna 14 of a mobile, portable, pocket-size, pager receiver 16. The radio signals are amplified by passage through an RF amplifier 18 and applied to a first mixer stage 20 where it is heterodyned with a signal of an appropriate frequency obtained from a crystal-controlled first oscillator 22. The resulting signal, at an intermediary frequency, after amplification through an IF amplifer 24 is applied to a second mixer 26 in which it is mixed with the signal from a second crystal-controlled oscillator 28. The resultant intermediate frequency signal, at a much lower frequency than the first intermediary frequency signal, is amplified by a second IF amplifier 30, and the amplified signal is applied to the input of a phase locked loop demodulator 32 through a limiter 34.

The demodulated signal, which consists of a series of binary bits representing the user code address and the caller phone number, is applied to the input of a micro-processor 36 through a decoder 38. The decoder 38 is controlled by a code plug modulator in the form of a PROM (programmable read only memory) containing the user's address code such that only a message signal containing a preamble and the proper address code is applied to the micro-processor 36 to initiate and execute the program functions stored in the micro-processor ROM (read only memory). One of the program functions of the micro-processor 36 is, upon receiving data from the demodulator 32, to apply the address signal to the decoder 38 to enable the decoder to decode messages preceded only by the appropriate address, and supply the message data to the micro-processor 36 for storage in the micro-processor RAM (random access memory). Another program function of the micro-processor 36 is the activation of, for example, a tone alarm 39 and/or a visual or vibrating alarm.

A further program function in the micro-processor ROM consists in activating a visual display module 40 in the form of a LCD (liquid crystal display) module. After a message has been displayed on the display module 40, a clock signal reset the display module to be ready to display a subsequently received message. However, the message remains stored in the RAM of the micro-processor 36. Consecutive radio messages with the appropriate user code signal in the message preamble are used in succession by the micro-processor 36 to activate the alarm 39 and to provide a display of the message on the display module 40 for a predetermined duration, and the consecutive messages remain stored in the micro-processor RAM, up to the storage capacity of the RAM.

When a user decides to recall the stored messages, he or she depresses an appropriate "Read" key 42 which provides an appropriate command to the micro-processor 36 to serially recover the information data stored in the RAM and provide the appropriate drive to the display module 40 to serially display the messages in sequence, as the "Read" key 42 is sequentially operated.

The pager of the invention is further provided with a buffer storage 44 which, when the user depresses a tone sound or "Dial" key 46, is loaded with the binary data corresponding to the number presently displayed on the display module 40. When the "Dial" key 46 is depressed, a program function in the microprocessor ROM instructs the micro-processor 36 to load the buffer storage 44 with the appropriate number and to apply the number stored in the buffer 44 to the input of a digital to dual tone multifrequency tone converter, or DTMF converter 48, supplying at its output a series of consecutive short duration signals of appropriate frequency in the audio range for dual tone multifrequency dialing. After amplification through an amplifier 50 connected to a miniature speaker 52, or other audio transducer, the caller's telephone number is automatically dialed by placing the pager 16 over the mouthpiece of a telephone handset 54, of the pushbutton, or dual tone multifrequency dialing type, such as to acoustically couple the speaker or audio transducer 52 to the telephone microphone. Any number stored in the micro-processor RAM can thus be recalled at will by the page user, displayed and used for automatically dialing a caller's telephone number.

A "Clear" key 56 is provided for clearing the RAM of the micro-processor 36 and resetting the pager of the invention in readiness for receiving, storing and displaying further messages. It will be appreciated that the program in the micro-processor ROM may be set up such that the "Clear" command clears only the number having been dialed when storage of that number is no longer required.

Having thus described the present invention by way of an example of structure disclosed herein for illustrative purpose only, what is claimed as new is as follows:

1. A dialing pager consisting of a portable radio receiver comprising means for receiving, amplifying and demodulating radio wave signals, said radio wave signals comprising address information data and telephone number information data, means for decoding said address information data, memory means for storing said telephone number information data upon recognition by said decoding means of predetermined address information data, means for providing an alert signal, means for simultaneously displaying for a predetermined period of time said telephone number information data in the form of the telephone number of a caller, means for controllably recalling and displaying said telephone number information data stored in said memory means, buffer storage means for storing said recalled and displayed telephone number information data, means for controllably converting said telephone number information data stored in said buffer storage means to a series of dual tone multifrequency signals, and transducer means for converting said dual tone multifrequency signals to audio signals.

2. The dialing pager of claim 1 wherein said transducer means comprises a speaker.

3. The dialing pager of claim 1 wherein a plurality of telephone number information data each representing a telephone number is stored in said memory means, each of said telephone number information data is sequentially recalled and displayed, and a selected one of said sequentially recalled and displayed telephone number information data is stored in said buffer storage for converting to said dual tone multifrequency signals.

4. The dialing pager of claim 2 wherein a plurality of telephone number information data each representing a telephone number is stored in said memory means, each of said telephone number information data is sequentially recalled and displayed, and a selected one of said sequentially recalled and displayed telephone number information data is stored in said buffer storage for converting to said dual tone multifrequency signals.

* * * * *